Dec. 29, 1936.  H. G. SCHNEIDER  2,065,540
PRODUCTION OF OXYGENATED ORGANIC COMPOUNDS FROM UNSATURATED HYDROCARBONS
Filed May 3, 1933
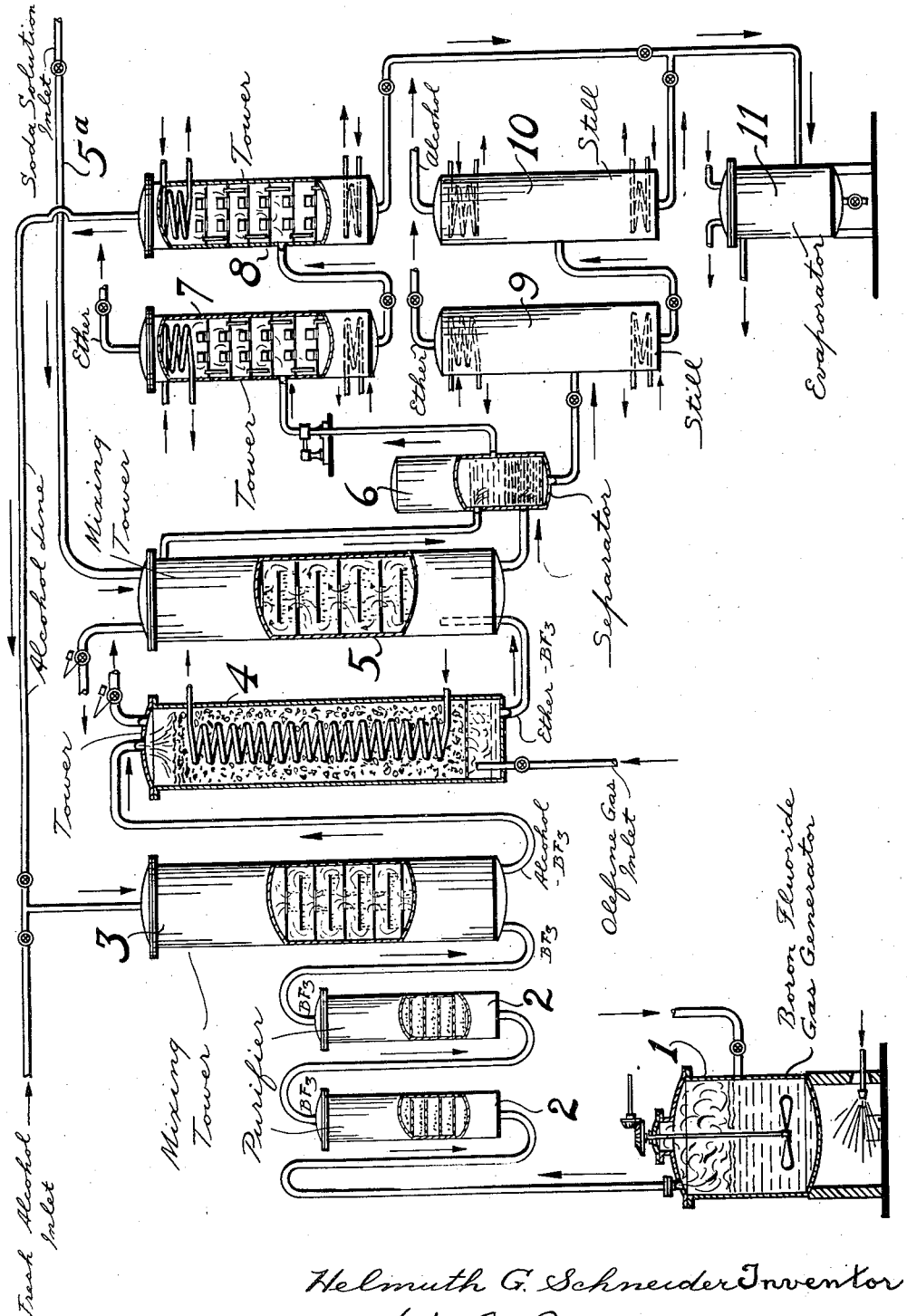
Helmuth G. Schneider Inventor
W. E. Currie Attorney Patented Dec. 29, 1936

2,065,540

UNITED STATES PATENT OFFICE 2,065,540

PRODUCTION OF OXYGENATED ORGANIC COMPOUNDS FROM UNSATURATED HYDROCARBONS

Helmuth G. Schneider, Elizabeth, N. J., assignor to Standard Oil Development Company, a corporation of Delaware Application May 3, 1933, Serial No. 669,147

12 Claims. (Cl. 260—106)

This invention relates to the production of organic compounds such as ethers, esters, etc. by the direct reaction of olefines with oxygenated organic compounds in the presence of a motivating agent.

One illustration of the invention will first be described briefly as applied to the production of esters. To esterify olefines one has usually heretofore resorted first to forming the corresponding alcohol with sulfuric acid, and then reacting the alcohol with an organic acid. In co-pending application Ser. No. 354,481, filed April 12, 1929 by Frolich and Brezinski, now Patent No. 1,951,747, a method was disclosed for effecting a direct esterification at temperatures generally above 100° C.

It has now been discovered that this direct esterification of at least certain olefines can be made to take place in the presence of a motivating agent of the boron fluoride type. In its application to the preparation of esters, the invention may be represented by the following equation:

where R, R', and R'' may be a hydrogen atom or a substituted group. The organic acid may be regarded as splitting in the course of the reaction, the hydrogen combining with one of the double bonds in the olefine, and the rest of the organic acid combining with the other side of the double bond in the olefine. Thus, a simultaneous esterification and saturation of the olefine is accomplished.

For the production of ethers, the oxygenated organic compound to be used is an alcohol instead of an organic acid. The reaction in this case, using a tertiary olefine, may be represented by the following equation:

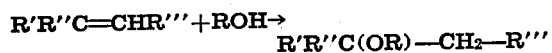

The branched ethers formed find particular adaptation as an anti-knock blending agent according to co-pending application of Hyym E. Buc, Serial No. 648,211 filed December 21, 1932. They may also be used as solvents, etc.

Furthermore, this reaction of an alcohol solution of $BF_3$ with tertiary olefines may be used as a convenient method of separating tertiary olefines from other olefines. For instance, if the olefinic gases available in a petroleum refinery are used in the manufacture of alcohols by absorption with sulfuric acid, the troublesome tertiary olefines may first be removed by scrubbing with a solution of boron fluoride in an alcohol. Such a treatment of the unsaturated gas leaves the primary and secondary olefines unchanged. A similar separation of secondary and tertiary olefines can also be accomplished by treating the mixture with boron fluoride dissolved in an organic acid according to the method mentioned above, in which case the secondary olefines are the ones reacted upon.

When boron fluoride is dissolved in methyl alcohol a molecular complex is apparently formed, containing the two constituents in equimolecular proportions even though an excess of the alcohol is used. In some cases, the motivating agent forms addition compounds with the product and in such cases these addition compounds may be decomposed in any suitable manner in order to liberate the motivating agent, for instance by hydrolysis with water or caustic soda solution, by distillation, etc.

The invention may be carried out in a number of different ways but it has been found particularly convenient to dissolve the motivating agent, such as boron fluoride, in the oxygenated organic compound and then to agitate this solution with the olefine to be treated.

With a gaseous olefine this may be conveniently and continuously carried out by the use of a column as shown in the accompanying schematic drawing which is one illustration of the entire process for preparing ethers, beginning with the manufacture of boron fluoride.

Referring to the drawing, numeral 1 is any convenient boron fluoride gas generator in which suitable raw materials such as sulfuric acid, calcium fluoride and boric acid or sodium borate are mixed and heated. The boron fluoride evolved is then purified in a suitable apparatus such as 2 and then is fed in at the bottom of a vertical tower 3 containing filler bodies over which methyl alcohol is allowed to trickle. The boron fluoride dissolves in the alcohol and the solution is collected at the bottom and conveyed to the top of a second tower 4 likewise containing filler bodies over which the alcohol-$BF_3$ is allowed to trickle downwardly. A suitable olefine gas is fed in at the bottom of this tower thereby reacting with the descending solution of alcohol-$BF_3$ and producing an ether-$BF_3$ solution in excess alcohol. Tower 4 is equipped with suitable temperature control apparatus, especially for cooling. The ether-$BF_3$ solution in alcohol is passed into the base of tower 5, into which a caustic soda solution is fed in at the top by line 5a and allowed to gravitate downward countercurrent to the ascending ether-$BF_3$ solution in alcohol which has a lighter gravity. After hydrolysis, the products from tower 5 are passed into separator 6 where two layers are formed, the upper layer consisting chiefly of ether and alcohol while the lower layer contains sodium borate, sodium borofluoride and any excess caustic soda which may have been used. The upper ether layer is drawn off from this separator and is then conveyed to suitable fractionating towers 7 and 8 where the ether and residual alcohol are distilled off in any order desired, the alcohol being recycled. Any residual water from 8 may be wasted or may be evaporated if it contains appreciable quantities of solids.

The lower layer from separator 6 is passed into suitable stills 9 and 10 to strip off any dissolved ether and alcohol and the residual aqueous solution is concentrated or evaporated to dryness in suitable apparatus 11, the residue from which may be used to regenerate $BF_3$ if desired.

The pressure in the various units or in the system as a whole may be regulated at will by suitable control valves.

If liquid olefines are used instead of an olefine gas, the reaction may be carried out in any other suitable type of apparatus. Esters may be manufactured in the same general type of apparatus as described above for the ethers, the only difference being the substitution of an organic acid in place of the alcohol fed into tower 3 and the use of a secondary olefine for feeding into the bottom of tower 4.

If desired, a combination process may be used for preparing both the ethers and esters in which case the ester-$BF_3$ solution is first prepared by dissolving $BF_3$ in an acid and treating the solution with a secondary olefine and then treating with the desired alcohol. The latter causes the liberation of the ester with simultaneous formation of an alcohol-$BF_3$ solution which is then further treated with a tertiary olefine to form the ether-$BF_3$ solution and then hydrolyzed to liberate the ether.

Another method of manufacture is to pass the gaseous motivating agent through a mixture of the oxygenated organic compound and olefine while agitating the same. A still further alternative is to mix the motivating agent and olefine (both in gaseous form) and pass the mixture into the oxygenated organic compound. In this case, however, care must be taken to prevent the polymerization of the olefine instead of the desired reaction. This may be done by either keeping the temperature sufficiently low or else by diluting with an inert gas in sufficient quantity.

A still further interesting and alternative procedure may be used for treating an olefine mixture containing both secondary and tertiary olefines. For example, the stabilizer bottoms available in a petroleum refinery are first reacted with an organic acid-$BF_3$ solution prepared as described above and then mixed with a suitable hydrocarbon solvent such as "Varsol" (varnolene, B. P. 300–400° F.) if desired, although this solvent may not be necessary if a large proportion of saturated hydrocarbons are present. Upon settling, two layers are formed, the lower one containing an ester-$BF_3$ solution and the upper one containing the hydrocarbon solvent and the tertiary olefines left after the removal of the secondary olefines in the reaction. The upper layer is then mixed with an alcohol and fed into the top of a suitable reaction tower while the bottom layer, the ester-$BF_3$ solution, is fed into the bottom of this same reaction tower. By countercurrent mixing, a double reaction takes place. The $BF_3$ is liberated from the ester-$BF_3$ solution and effects a reaction between the alcohol and the tertiary olefine, resulting in the production of an ether-$BF_3$ solution dissolved in the excess acohol. This solution may be recovered as a bottom layer in a suitable settling tank. Countercurrently with that reaction the ester now liberated from the ester-$BF_3$ solution dissolves in the hydrocarbon solvent and may be recovered as the upper layer in the separating tank. The ester may be recovered from the solvent by distillation and the ether may be recovered from the ether-$BF_3$ solution by the methods previously described.

In this double reaction procedure just described it is observed that the alcohol and tertiary olefine are caused to react by an ester-$BF_3$ solution or complex. In other words, in reactions of the type involved in the present invention the motivating agent may not only be a halide of the boron fluoride type alone but may be a molecular complex of such a compound in conjunction with another compound such as the ester referred to above in the ester-$BF_3$ complex.

Furthermore, instead of using boron fluoride as the motivating agent, other halides of the boron fluoride type may be used such as titanium tetrachloride, silicon fluorides and others. Motivating agents of this type are adapted to react at low temperatures and to cause the direct esterification and other such reactions also at low temperature, thereby substantially avoiding simultaneous polymerization of the olefine.

As the reactions are usually exothermic, cooling is generally required to keep the temperature sufficiently low. The temperature and pressure to be used will depend to a large extend on the particular raw materials being treated. However, it is usually desirable to keep the temperature relatively low, that is, between the approximate limits of −100° C. and 100° C., preferably at room temperature, and most reactions can be carried out satisfactorily at atmospheric pressure although if it is desired to speed up the reactions or to operate in the liquid phase, superatmospheric pressure may be used. The reaction involved is almost quantitative on the basis of the motivating agent used.

The invention is applicable to olefines lighter than pentene, such as propylene, butylene, etc., as well as to the higher members of the olefine series. The unsaturation need not occur in open chain aliphatic hydrocarbons but may be part of a ring or cyclic compound such as cyclohexene. Also, instead of using single olefine hydrocarbons, mixtures of such pure compounds or mixtures of unsaturated hydrocarbons such as occur in petroleum products either naturally or as a result of various refining, cracking, or other treating processes, or any other unsaturated hydrocarbon product resulting from any other industrial process may be used. It may be desirable to select certain types of olefines according to the kind of oxygenated organic compound being used in the reaction. For example, it has been found that the secondary olefines are particularly susceptible to the direct esterification with organic acids; while on the other hand for the preparation of ethers, the tertiary olefines are preferred.

The following examples are given for the purpose of illustration only:

*Example 1.*—20 parts of pentene-2 were treated at room temperature with 10 parts of an acetic acid solution of boron fluoride. The product upon hydrolysis yielded 10.5 parts of secondary amyl acetate.

*Example 2.*—19 parts by weight of boron fluoride were dissolved in 30 parts by weight of acetic acid, giving 36 parts by volume of solution. 100 parts by volume of pentene-2 were then reacted with the acid solution and the products of the reaction gave a homogeneous solution of 124 parts by volume, from which were obtained 39 parts by volume of secondary amyl acetate.

*Example 3.*—Boron fluoride was dissolved in methyl alcohol and the solution was agitated with trimethyl ethylene, thereby producing an ether, namely, methyl tertiary amyl ether.

*Example 4.*—Example 3 was repeated but isobutylene was used instead of trimethylethylene, and as a result methyl tertiary butyl ether was obtained.

In place of the acetic acid mentioned in Examples 1 and 2, other organic acids may be used such as formic, propionic, butyric, as well as higher members of the fatty acid series such as oleic, stearic, and the like, or mixtures such as obtained by oxidation of paraffin wax or liquid petroleum distillates. Also, instead of using aliphatic carboxylic acids, aromatic acids such as benzoic acid and also ring compounds containing an acid grouping in an aliphatic side chain may be used. Substituted organic acids and their various derivatives and homologues, as well as mono-, di-, and poly-basic acids, may also be used.

When using alcohols as the oxygenated organic compounds, the invention is not limited to methyl alcohol but any of the alcohols of the aliphatic series are suitable, especially the primary alcohols. Furthermore, dihydroxy and other polyhydroxy alcohols, carbohydrates, cellulose, cotton, etc. may be used.

In a broader aspect of the invention, olefinic hydrocarbons, in the presence of a motivating agent, are reacted with any oxygenated organic compound containing an active hydrogen, as in alcohols and acids, or any enolic compound which may contain an active hydrogen by rearrangement, as ketones and aldehydes, etc. may be used.

It is not desired to be limited by the foregoing examples or theories of the operation of the invention but by the following claims in which it is our intention to claim all novelty inherent in the invention as broadly as the prior art permits.

I claim:

1. The process of preparing esters which comprises reacting secondary olefines having at least 3 carbon atoms with carboxylic acids at a temperature below 100° C. in the presence of a motivating agent selected from the group consisting of boron fluoride, titanium tetrachloride and silicon tetrafluoride.

2. Process according to claim 1 in which an aliphatic acid is used.

3. Process according to claim 1 in which an aromatic acid is used.

4. Process according to claim 1 in which benzoic acid is used.

5. The process of preparing esters which comprises reacting secondary olefines having at least 3 carbon atoms with fatty acids at a temperature substantially below 100° C. in the presence of boron fluoride.

6. Process according to claim 5 in which a gaseous olefine having at least 3 carbon atoms is introduced into a solution of the boron fluoride in the fatty acid.

7. The process of preparing esters, which comprises reacting pentene-2 with acetic acid at about room temperature in the presence of boron fluoride thereby producing secondary amyl acetate.

8. The continuous process for producing esters, which comprises continuously feeding olefines having at least 3 carbon atoms and carboxylic acids into a reaction chamber at a temperature below about 100° C. in the presence of boron fluoride and continuously withdrawing an ester product from the reaction chamber and recovering ester therefrom.

9. The process of preparing esters, which comprises reacting secondary olefines having at least 3 carbon atoms with low molecular weight fatty acids at a temperature not substantially above room temperature in the presence of boron fluoride.

10. Process according to claim 9 in which the fatty acid used is acetic acid.

11. The continuous process for producing esters, which comprises continuously feeding secondary olefines and fatty acids into a reaction chamber at a temperature not substantially above room temperature in the presence of boron fluoride, and continuously withdrawing an ester product from the reaction chamber and recovering esters therefrom.

12. The process of separating secondary and tertiary olefines from mixtures thereof, which comprises treating said mixtures with a solution of boron fluoride dissolved in a carboxylic acid to cause esterification of the secondary olefines, and separating unreacted olefines from the reaction products.

HELMUTH G. SCHNEIDER.